US012751803B2

(12) United States Patent
Stagnaro

(10) Patent No.: US 12,751,803 B2
(45) Date of Patent: Oct. 6, 2026

(54) DENTAL FLOSS HOLDER AND DISPENSER

(71) Applicant: Brent Joseph Stagnaro, Manchester, NH (US)

(72) Inventor: Brent Joseph Stagnaro, Manchester, NH (US)

( * ) Notice: Subject to any disclaimer, the term of this patent is extended or adjusted under 35 U.S.C. 154(b) by 862 days.

(21) Appl. No.: 18/073,334

(22) Filed: Dec. 1, 2022

(65) Prior Publication Data

US 2024/0180677 A1 Jun. 6, 2024

(51) Int. Cl.
*A61C 15/04* (2006.01)

(52) U.S. Cl.
CPC .......... *A61C 15/046* (2013.01); *A61C 15/043* (2013.01)

(58) Field of Classification Search
CPC ............................ A61C 15/043; A61C 15/046
See application file for complete search history.

(56) References Cited

U.S. PATENT DOCUMENTS 1,598,101 A * 8/1926 Newman .............. A61C 15/043 206/472
2,929,541 A * 3/1960 Castelli ................ A61C 15/043 242/138
4,253,477 A * 3/1981 Eichman .............. A61C 15/046 132/323
4,655,233 A * 4/1987 Laughlin .............. A61C 15/046 D28/68
4,925,073 A * 5/1990 Tarrson ................ A61C 15/043 242/138
5,156,311 A * 10/1992 Spencer, Jr .......... A61C 15/043 225/41
2002/0106607 A1* 8/2002 Horowitz ............. A61C 15/047 433/118
2003/0188761 A1* 10/2003 Garcia ................. A61C 15/043 132/309
2016/0296308 A1* 10/2016 Ackel .................... A61C 15/00
2023/0270531 A1* 8/2023 Bushman ............. A61C 15/046 132/323

* cited by examiner

*Primary Examiner* — Nicholas D Lucchesi

(57) ABSTRACT

The device is a dental filament dispenser and holder which incorporates a spool of dental filament in a compartment wherein the filament is dispensed via one of two convertible framed openings and held utilizing Split Ring-spring snap fastener components; included are short walls and connecting straps for supporting and securing the snap fastener components, an indentation, convertible slots, a rotatable front wall by which to convert the slots into the framed openings and vice versa, a lid, and severs to divide filament. Filament derived from a framed opening is placed through an open stud component of the snap fastener and is held by the interlocking of the stud with a socket component of the snap fastener. The device comprises two snap fasteners distanced by the indentation about which the filament is manipulated and held into a personalized flaccid bight for the purpose of interdental cleaning.

16 Claims, 3 Drawing Sheets

DENTAL FLOSS HOLDER AND DISPENSER

BACKGROUND OF THE INVENTION

Field of the Invention

The invention relates generally to improvements regarding a device for dispensing and holding dental floss or dental filament from an incorporated source of supply such as a reeled spool, and more specifically, to those that hold dental filament in a flaccid posture utilizing snap fit joint fasteners, and more particularly a device utilizing annular type Split Ring-spring snap fastener means wherein only said floss or dental filament of the device enters the user's mouth during the act of interdental cleaning.

Background Art

There has been many patented devices to assist the act of removing debris from between teeth and gums by the method of using floss or dental filament, but no device has proven completely adequate to solve all the challenges related to holding dental floss or dental filament for to assist the activity generally termed as 'flossing'. This invention is a significant improvement satisfying a long-felt need in the field of interdental hygiene since it solves a great many of the major inherent challenges prior art, in one way or another, has unsatisfactorily accomplished.

Several examples of prior art require dental floss to occupy at least one inaccessible internal channel of the device before it is exposed to the user for its use. For purpose of clarity, the term 'floss' is used in connection with and reference to prior art and the term 'dental filament' or 'filament' is used in reference with the present invention disclosed herein. An important inherent challenge to overcome with regard to prior art is the inability for the floss to be coursed through the device in the event of floss breakage, thus rendering the device useless if the floss is unable to be easily threaded or coursed through the device. The art of the present invention disclosed herein does not contain any inaccessible internal channels. In the event of filament breakage, the process of coursing it through the device is easily available and achievable to the user; of which, that procedure is described herein under another heading.

Other prior art call attention to the challenges associated with the use of binder buttons, cleats, screws, thumb nuts, bight-slots, notches, and the like to secure or hold floss. These types of holding techniques require the user to wind floss around an element, turn a threaded nut so to apply compression, ox catch floss in a wedged shaped notch configuration. It is known that floss is easily damaged or severed when it comes between the sharp threads of mechanical fasteners. The technique of winding floss about a cleat, post, or binder element can be confusing if the user does not remember which direction to unwind the floss for its removal. Floss can unintentionally be removed from a bight-slot if force is applied counter to the direction of placement. Also, a nut not permanently attached to its device can become separated and lost, thereby rendering the device useless and frustrating the user; reducing their will to floss. The present invention disclosed herein provides art which encourages a user to perform the act of interdental cleaning by utilizing the preferred number of two Split Ring-spring snap fasteners to hold dental filament. Split Ring-spring snap fastener components provide a unique and superior capacity with which to tightly and safely hold filament while completely surrounding it compared to that of previous types of art; thus, eliminating the possibility of the filament being inadvertently or unintentionally dislodged during its use as disclosed and described herein. Also, their inherent smooth and curving surfaces over which they interlock eliminate the possibility of filament breakage. Another important advantage is directed toward their familiarity in the eyes of the public. Split Ring-spring snap fasteners are widely used on every day clothing and other items granting them prior public knowledge with respect to their operation even though they are being used in a new and unique way. Furthermore, an advantageous feature of the improved invention herein connects the components of the snap fasteners to the device; thus, preventing them from becoming lost.

Some prior art uses a complete loop of floss for interdental hygiene, thus granting the user the advantage of using their fingers to maneuver the floss between their teeth and gums; of which, is often practiced by professionals on their patients. The challenges with this type of prior art places the user in search of a new loop when the filament becomes damaged or breaks. Also, the manufactured standardized size is uniform and does not fit the personalized requirements of every user. Some users need a larger loop circumference in order to reach their rear teeth, while others need a smaller loop so to better grip the loop on their fingers. The art of the present invention disclosed allows the user to easily personalize the size of a semi-looped or bight of flaccid filament held by the snap fasteners and provides a spool of filament incorporated within the device so to fulfill the immediate needs of the user in the event of filament breakage.

Other types of prior art require individual holding members securing a strand of floss embodied as caps, rings, holders, grippers, thimbles, and the like to occupy the user's hands while flossing. These types of art triple task the user by dividing their attention among placing the floss between their teeth, manipulating the floss on their fingertips, and keeping a grasp on the holding members. Also, it is likely a holder member can become lost when it is detached from said segment or strand of floss; rendering the prior art useless. The art of the invention disclosed focuses the user's attention only on manipulating the filament since the container, dispenser, and the holding components of the device are not required nor intended to occupy the user's hands while cleaning teeth; thus, focusing the user's attention entirely toward manipulating the filament on their fingertips for its proper placement within their mouth.

An assortment of examples in this class of art call attention toward manufactured proprietary floss arrangements described as knobs, grommets, gripping, and locking members attached to and flanking ends of a floss held taunt by a device. These types of art are subject to limited sources of supply, thus threatening their availability and making the user vulnerable to scarcity in the market. Supply may also become unavailable if the original manufacturer terminates the product or they go out of business. The art of the present invention disclosed herein permits a variety of reeled spool sizes and filament types, including a variety of coatings commonly provided by different manufactures to be incorporated in the compartment and held by the device; guarantying the longevity of its usefulness. For example, per experimentation, the known dental filament types the present invention can accommodate are: woven, dental-tape, silk, and polytetrafluorethylene along with non-waxed, waxed, and friction reducing coatings.

Many patented art places floss in tension between tongs, forks, arms, and the like. These types of devices dramatically reduce the amount of contact the floss has on the surface area of a tooth. With floss held tautly, the amount of flexibility regarding it being able to conform to the curvature of a tooth is extremely limited, thus dramatically reducing the effectiveness and efficiency of flossing. Also, using a device to place floss between teeth greatly reduces a user's tactile sensation when applying force for its placement; thus, greatly increasing the risk of damage to their gums by applying too much force on the instrument. The art of the present invention disclosed herein provides a user the unique opportunity to clean between their teeth using a flaccid filament held in a semi-looped or bight posture; granting the ability to mimic the curvature of each tooth, thereby facilitating greater contact and cleanliness while the device holds the filament for the user. Also, the device provides the advantage of using the user's fingers so to maximize their tactile sensation.

With the previously stated types of prior art in mind, it is obvious that there is a tremendous long-felt need for an easy and novel device utilizing trusted and known technology in a unique way so to provide the field of dental hygiene a device which is designed and tailored to allow a user to personally determine the size and length of dental filament best suited to their own requirements; a device which is not an instrument for single use but one in which is able to be refilled and used many times, thus affirming the device's aptitude for longevity; a device which is versatile by enabling it to accommodate many different types and brands of dental filament, thereby allowing a user to change the spool to accommodate their needs as they age; a device which is easily refillable by a multitude of reeled spools provided on the market, thus reducing the cost of a refill spool while increasing the likelihood of availability; a device which is intended to accomplish the preferred task of allowing a filament to take the shape of a tooth while holding the filament so the user is not encumbered; a device easily threaded or coursed in the event of filament breakage; and, a device which takes into account the preferred use of the dominate hand of every user by providing additional number of parts on the device so to accommodate right, left, and ambidextrous handed users, of which will be disclosed under another heading herein. By patent approval, the public shall be offered a device which will motivate those individuals presently harmed by wrapping dental filament around their fingers and frustrated or reluctant to the act of interdental cleaning due to the prior art offered and methods approved by patent and available on the market. It is emphasized that this invention will promote, develop, or increase a healthier habit of dental hygiene for the public.

BRIEF SUMMARY

The invention disclosed herein is a dental filament dispenser and holder for the useful purpose of interdental cleaning to remove food and dental plaque from between teeth and gums. A novel and unobvious aspect of the device is with regard to it utilizing annular snap fit fastener means known in the industry as Split Ring-spring snap fasteners to hold dental filament. A Split Ring-spring snap fastener is quickly, easily, and simply adjustable with regard to being interlocked or disengaged. They provide a tight, secure, and protected hold upon a multitude of dental filament types and coatings while allowing a user to manipulate a length of filament into a suitable, personalized sized flaccid, semi-looped or bight posture; augmenting the act of flossing by granting all the benefits associated with placing dental filament within the mouth with the use of fingertips and freeing up hands from having to hold a holding device.

An advantage of utilizing two, but at least one, Split Ring-spring snap fasteners to hold dental filament goes to their public familiarity, popularity, commonality, and function. They are commonly used to temporarily connect items together such as on apparel, leather goods, handbags, jackets, and the like where the open stud component and the hollow eyelet component each only have one purpose; which is for the stud to interlock with a socket component and the eyelet to join with the stud thereby connecting each with the article they are used upon. The device's novelty and uniqueness is directed towards repurposing or applying an additional purpose to the functionality of the stud and eyelet by coursing the dental filament through the center opening of each component; thus, surrounding the filament with the stud and eyelet thereby holding the filament by the interlocking of the interference fit connection between the socket with that of the stud. Also, while providing a very strong holding technique they do not cause damage to dental filament due to the smooth, rounded surfaces of their components and interlocking design. Utilizing Split Ring-spring snap fasteners in this novel way eliminates the pain and frustration with respect to winding a duel ended length of filament around a user's fingers during the process of dental hygiene.

Providing two Split Ring-spring snap fasteners at a distance wherein each location comprises at least a stud and a socket grants the user the advantage of being able to manipulate and hold a 'working end' and 'standing end' of dental filament into a semi-looped shape or flaccid 'bight' used for interdental cleaning. Bight is rope terminology used herein to reference a portion of dental filament intentionally manipulated to double back on itself, somewhat liken to an uppercase Omega symbol of the Greek alphabet forming a semi-looped flaccid shape to be used in the act of flossing or interdental cleaning. The 'working end' and 'standing end' of the dental filament are also each rope terminology used herein to reference portions of the dental filament being manipulated during its coursing through the device. The working end, in general, is the severed loose end portion of the filament unreeled from an incorporated reeled spool of said filament initially being pointed and targeted through the parts and components of the device. The standing end, in general, is the portion of the filament between the general working end portion and the spool, thus being the length of filament connecting the working end with the spool.

Excluding the filament itself, the invention provides the same type of parts left and right about its sagittal or lateral plane midpoint in order to provide two separate and distinct paths through which to thread or course the filament; meaning that two slots, two framed openings, and two severs have been provided where only one slot, one framed opening, and one sever is minimally required for the device to perform or function. Two of each part stated above has been intentionally provided for a purpose of providing equal opportunity among left, right, or ambidextrous handed users in order to accommodate every user's personal dexterity with regard to coursing the dental filament through the device. Since symmetry of the device provides for two distinct paths through which to course the filament, each being appropriate with regard to its function, the drawings and disclosure herein randomly show and describe the standing end of dental filament on the left side of the invention while the working end suspends along the right side. The following example explains a method of coursing dental filament through the device from the spool. Once an initial coursing of filament has been successfully achieved, certain steps may be avoided until the originating incorporated reeled spool is replaced with another spool.

With a spool having been placed on a post in the compartment of the container, the components of a first and a second Split Ring-spring snap fastener having been disengaged, a rotatable lid placed about an exterior surface of a back wall, and a front wall having been rotated into a collapsed or open position exposing an access opening to the compartment; a user, holding the working end of the dental filament unreeled from the spool, places it into a left slot. With the front wall then rotated to an upright or closed position thereby fulling covering or closing the access opening, the working end is placed into and through the joined opening of a stud component and an eyelet component of the first Split Ring-spring snap fastener, thus each being a first stud component and a first eyelet component respectfully; included are a left strap and a left short wall. Once coursed through the first eyelet, the working end of the dental filament egresses into an indentation formed between the left short wall and a right short wall about which the filament may be grasped, manipulated, and pulled for a length as it unreels from the spool. It is then placed into and through the joined opening of an eyelet component and an open stud component of the second Split Ring-spring snap fastener, thus each being a second eyelet component and a second open stud component respectfully; included are a right strap and the right short wall. Again, the working end of the filament is grasped and pulled for an advantageous length, thus allowing it to suspend alongside the device.

The suspended working end of the filament is held as a result of the user touching and aligning a socket component joined with a cap component of the second snap fastener, each being a second socket component and a second cap component respectfully, with that of the second stud; and, by the act of compression upon the second snap fastener components, a split ring-spring incorporated in the second socket is forced over and around the projecting portion of the second stud, thus interlocking the second snap fastener components thereby holding the dental filament. Connected with the joining of the second socket and second cap is a right strap connected to the right short wall thereby connecting the second socket and second cap with the device. With the suspended working end of the filament held, the standing end, now assumed to be spanning the indentation, is able to be easily manipulated into a personalized flaccid bight by pulling up on it; thereby, increasing its length as the filament unreels from the spool. To assist in the grasping of the filament while it spans the indentation, the art of the device enables the user's fingers to be placed under the filament due to a suitable distance provided between the invert opening level or base interior level of each said eyelet with that of a top wall of the container. Once achieved, a personalized bight is held as a result of the user touching and aligning a socket component joined with a cap component of the first snap fastener, thus each being a first socket component and a first cap component respectfully, with that of the first stud; and, by the act of compression upon the first snap fastener components, a split ring-spring incorporated in the first socket is forced over and around the projecting portion of the first stud. The bight is held with the interlocking of the first and second snap fastener components. Connected with the joining of the first socket and first cap is a left strap connected to the left short wall thereby connecting the first socket and first cap with the device. At the user's discretion, during the act of interdental cleaning, the lid may remain about the back wall or be placed in the indentation covering the top wall. With the lid in either position the device functions properly and the user is unencumbered.

The user is now able to manipulate the bight on the ends of their fingers in order to clean between their teeth and gums without the container, dispenser, or holders occupying their hands. In the event the filament becomes too soiled or breaks, the components of the first and second snap fasteners are disengaged by applying torque force upon the appropriate said cap and socket component and their respective strap; thereby, enabling the filament to be adjusted, removed, or coursed through the invention as required. In the common event the suspended working end of filament becomes too long, the invention provides two industry standard severs for to divide the filament. Also, the advantage of connecting the cap and socket component of each snap fastener to the device eliminates them from becoming detached from the device and lost.

These and other features, aspects, and advantages of the present invention will become further understood with reference to the drawings, detailed description, and claims provided herein.

LIST OF REFERENCE NUMBERS

Figure 2:
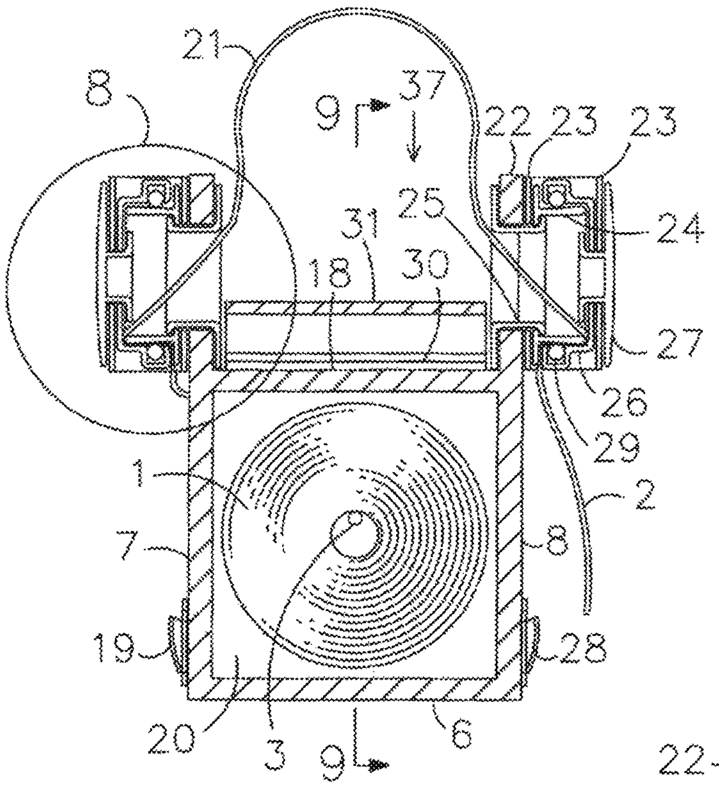
FIG. 2 is a section on the line 2-2 on FIGS. 3, 4, 5, and 9 looking in the direction of the arrows.

1. Spool
2. Filament
3. Post
4. Front wall
5. Bottom Hinge
6. Bottom wall
7. Left wall
8. Right wall
9. Notch
10, Left slot
11. Right slot
12. First stud
13. First eyelet
14. Left strap
15. Left short wall 16. First cap
17. First socket
18. Top wall
19. Left sever
20. Back wall
21. Bight
22. Right short wall
23. Right strap
24. Second stud
25. Second eyelet
26. Second socket
27. Second cap
28. Right sever
29. A split ring-spring
30. Top hinge
31. Lid
32. Overhang
33. Catch
34. Mouth)
35. Left framed opening
36. Right framed opening
37. Indentation

DETAILED DESCRIPTION OF THE INVENTION

While this invention is susceptible of embodiments in different forms and various procedures of operation, this detailed description informs of a preferred embodiment for which to teach and instruct the best mode contemplated of carrying out the invention.

Referring to the drawings and art of the invention in greater detail, FIGS. 1 through 5 and 9 show a device incorporating and supporting a spool 1 of reeled dental filament 2. Common types of dental filament known and referred to in the industry today go by the generic terms of dental tape, dental floss, dental silk, and polytetrafluorethylene (PTFE) of which, the invention can accommodate at the discretion of the user. Also shown in the drawings and explained herein are a coursing and a holding of filament 2 in a let out or unreeled posture from the spool 1.

Figure 1:
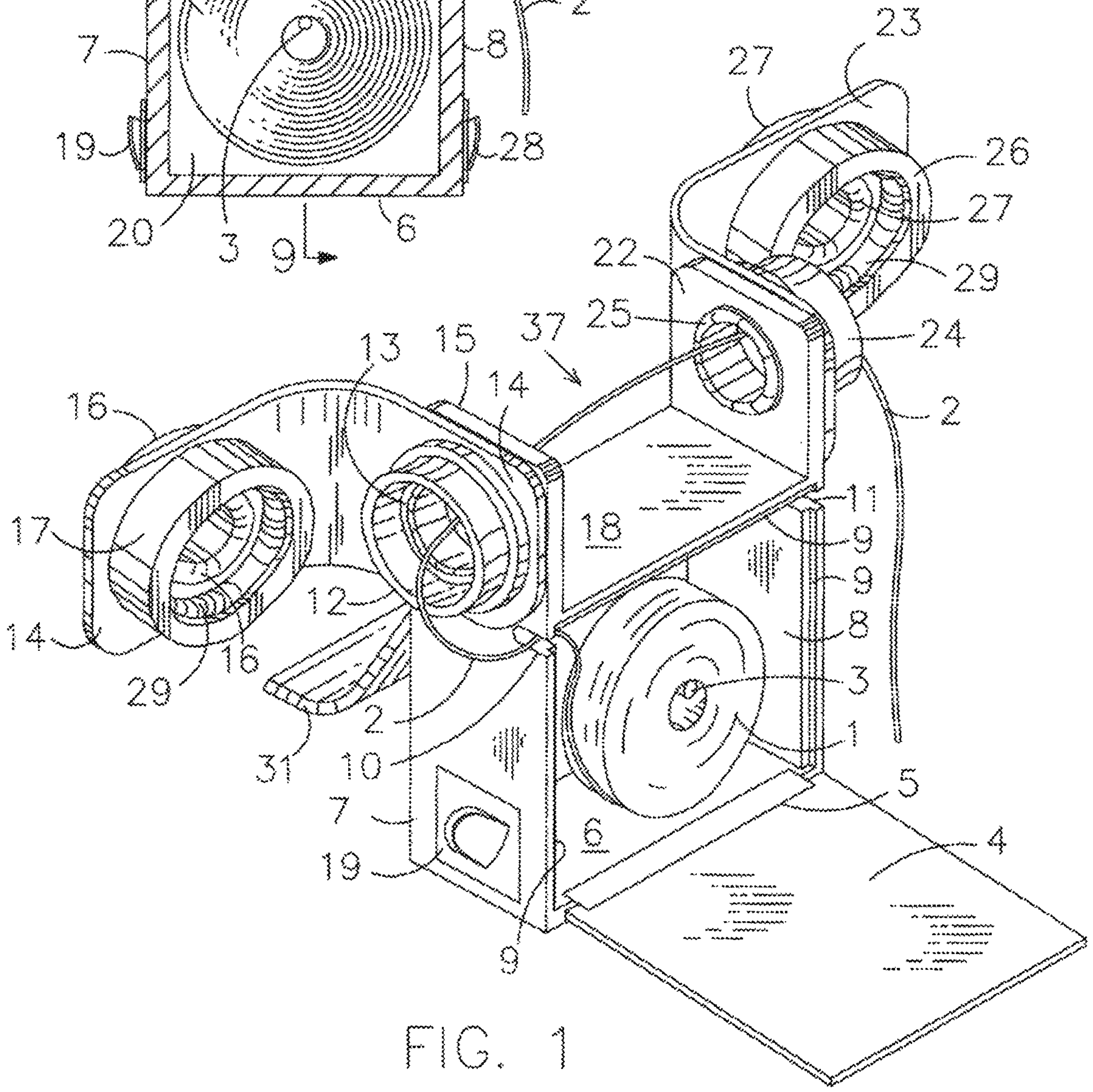
FIG. 1 is an isometric view of the invention showing Split Ring-spring snap fasteners disengaged and a rotatable front wall in an open or collapsed position.
Figure 4:
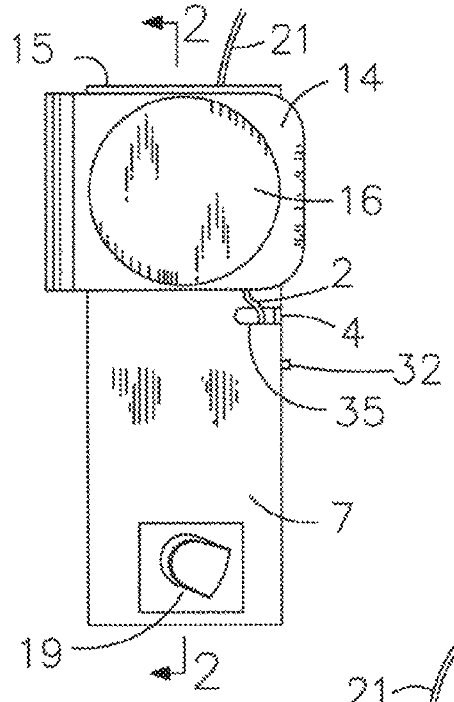
FIG. 4 is a left side elevation on the line 4-4 of FIG. 3 looking in the direction of the arrows.
Figure 5:
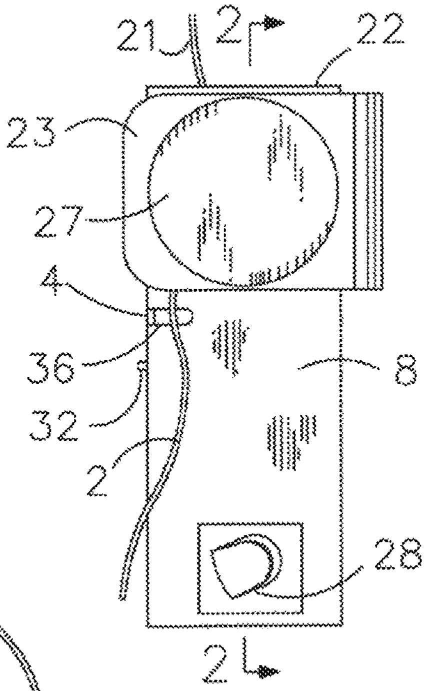
FIG. 5 is a right side elevation on the line 5-5 of FIG. 3 looking in the direction of the arrows.
Figure 3:
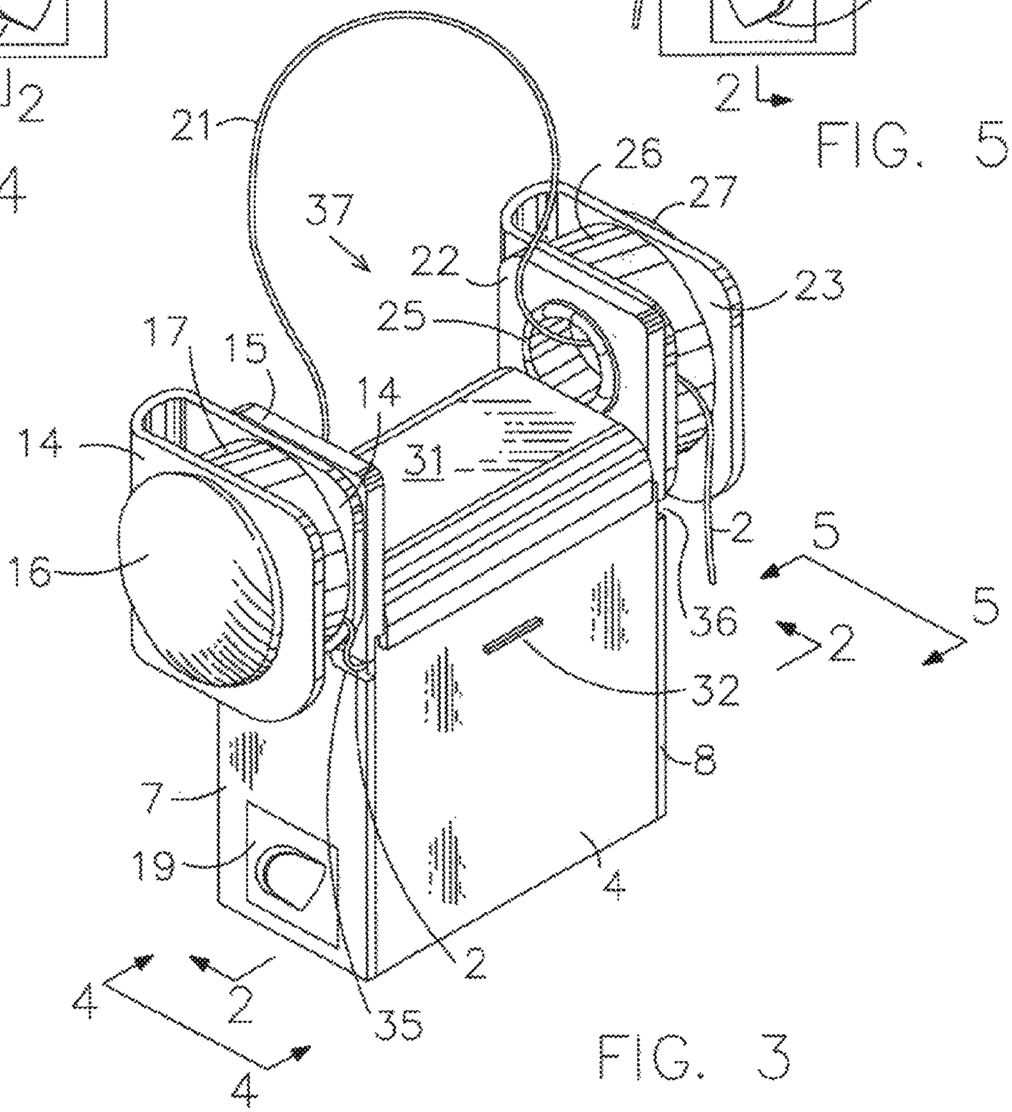
FIG. 3 is an isometric view of the invention showing Split Ring-spring snap fasteners interlocked and the front wall in a closed or upright position.

FIG. 1 shows the spool 1 incorporated in a container of the device wherein the interior of the container is a compartment of the device. The center opening of the spool 1 is rotatable mounted and supported on a centrally located post 3 molded, attached, contiguous, and concurrent as to make it a suitably perpendicular appendage of an interior surface of a suitably vertical static back wall 20 of the compartment. The circular outer diameter, length, and strength of the post 3 as well as the dimensions of the compartment, are suitable to accommodate and receive the size, weight, and a centered diameter opening of the spool 1 which should include a variety of commonly known reeled dental refill supply spools provided in commerce. As shown in FIGS. 1 and 3, to store, safeguard, protect, and promote hygiene during the act of flossing or interdental cleaning, the spool 1 is incorporated in the compartment surrounded by container wall. The device is preferably configured by a molded unitary plastic injection molding processes wherein a molten thermoplastic polymer is injected into a cavity of a mold for production. For the purposes of manipulating the filament 2 or replacing the spool 1, access into the compartment is provided by a front wall 4 having a capacity to rotate about its base due to a living bottom hinge 5 interposed between a static bottom wall 6 located at the base of the device and the front wall 4 making for a rotatable front wall 4. The bottom hinge 5 is a thin area in a molded plastic part which enables the molded plastic part to fold along a creased line thereby forming a hinge. There are certain thermoplastic polymers capable of producing a living hinge and accepted for use in dental filament dispensers by the Food and Drug Administration. The preferred type of thermoplastic polymer to be used is polypropylene. In FIG. 1, the rotational movement of the front wall 4 is shown collapsed or in an open position, thus exposing the opening and allowing access to the compartment; and, in FIG. 3, the rotational movement is shown in an upright, covering, or closed position, thus denying said access.

Referring to FIGS. 1 and 3, with the assumption a user will consider the front wall 4 as a frontal portion of the device and since the invention expresses symmetry having the same type of parts and components left and right about its sagittal or lateral plane midpoint, for teaching and clarity of explanation with regard to the invention's operation, best mode, and implementation, the front wall 4 is designated herein as the front; while a left, a back, and a right designation follow suit respectively clockwise about the front wall 4. The designation of bottom and lower, as well as top and upper, are in relation to the inferior and superior portion of the invention respectively.

To restrict the rotation of the front wall 4 from entering into the compartment while also promoting hygiene, the perimeter edge of a suitably vertical left wall 7, a suitably horizontal top wall 18, and a suitably vertical right wall 8 of the container, each being a perimeter edge adjoining the access opening into the compartment, are to receive an interference fit recessed squared notch 9 to that of their respective left, top, and right squared-off perimeter mating counterpart of the front wall 4. The notch 9 is to receive and stop the rotational movement of the front wall 4 while providing a tight doglegged avenue of obstruction; preventing debris from entering between the parts while the front wall 4 is in a closed position. To assist a user with accessing the compartment, a linear overhang 32 is provided concurrent during the molding process and is located centrally on the upper exterior surface of the front wall 4 as shown in FIGS. 3, 4, 5, and 9. When pulling force is applied upon the overhang 32, the interference fitted components are dislodged and the front wall 4 is free to rotate into an open position, thus exposing the opening and providing access to the compartment.

Shown in FIG. 1 are two slots, a suitable left slot 10 and a suitable right slot 11. The dental filament 2 is shown egressing the compartment via the left slot 10, thus expressing the ease in which the filament 2 can be laterally placed into either the left slot 10 or the right slot 11 at the user's choosing due to the symmetry of the device. The filament 2 however must only occupy one of the two said slots on any occasion. Furthermore, as shown in FIGS. 3, 4, 5, and 6, since it is intended that the filament 2 egress the compartment guided by way of a framed opening, a result of covering the access opening with the front wall 4 closes the open end of each said slot; thereby, the left slot 10 coverts into a suitable left framed opening 35 and the right slot 11 converts into a suitable right framed opening 36. In turn, rotating the front wall 4 to a collapsed position exposes the access opening which converts the left framed opening 35 into the left slot 10 and converts the right framed opening 36 into the right slot 11. This conversion process is repeatable as a result of opening and closing the front wall 4. The placement of the left slot 10 and the right slot 11 is such that they interrupt the top solid surface continuity of the left wall 7 and the right wall 8 respectively, thereby reducing the length of filament 2 egressing a said slot and entering the device at an adjacent point of entry; minimizing the likelihood of the filament 2 encumbering the user while it is coursed on the exterior of the device.

Figures 6, 7, 8, 9:
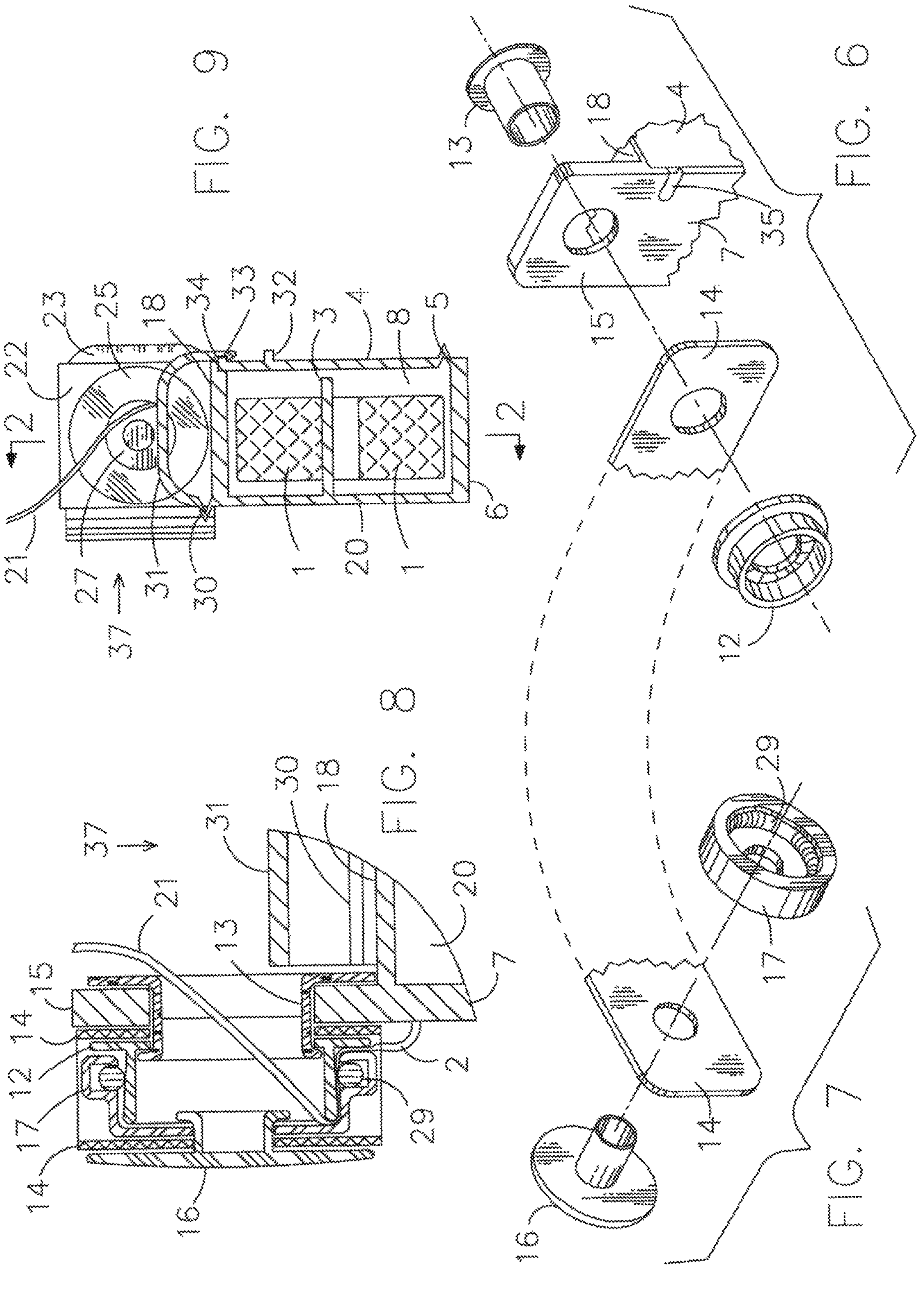
FIG. 6 is an exploded isometric view showing an alignment of Split Ring-spring snap fastener components; included is a left short wall and a partial left strap shown truncated by a jagged edge but dashed to a partial left strap shown in FIG. 7 so to express its continuation.
FIG. 7 is an exploded isometric view showing an alignment of Split Ring-spring snap fastener components; included is a partial left strap shown truncated by a jagged edge but dashed to a partial left strap shown in FIG. 6 so to express its continuation.
FIG. 8 is an enlarged detail of circled section 8 in FIG. 2.
FIG. 9 is a section on the line 9-9 on FIG. 2 looking in the direction of the arrows.

Referring to FIGS. 1, 2, and 3, the device utilizes two Split Ring-spring snap fasteners each containing an open stud component, a post component which is also called an eyelet component, a cap component, and a socket component which incorporates a split ring-spring for to hold the filament 2 in a flaccid bight 21 posture. Bight is rope terminology used herein to reference a portion of dental filament intentionally manipulated to double back on itself; in this case somewhat liken to an uppercase Omega symbol of the Greek alphabet forming a semi-looped flaccid shape to be used in the act of flossing or interdental cleaning. The economical approach to connecting known Split Ring-spring snap fastener components join the hollow cylindrical tube of the eyelet with the flatly torus flanged opening of the open stud, and join the shaft of the cap with a torus flanged opening of the socket. Joining means is by rolling, pressing, crimping, splaying, riveting, or the like capable of rendering an equal connection as shown in FIGS. 1, 2, and 8. Stud and socket components are interlocked with a split ring-spring 29 incorporated within the socket having been contracted around the projecting portion of a stud component; and, are disengaged when this is not the case.

FIG. 6 is an exploded view showing the preferred sequence and orientation of an open stud of the first Split Ring-spring snap fastener thus being a first stud 12 component, an end portion of a left strap 14 (shown truncated by a jagged edge profile), a left short wall 15, and an eyelet of the first Split Ring-spring snap fastener thus being a first eyelet 13 component all comprising an assembly of parts and components adjacent the left slot 10 for which to assist in the holding of the filament 2. The left short wall 15 provides structural support for the first stud 12, left strap 14, and first eyelet 13 and is molded, attached, contiguous, and concurrent with that of the left wall 7 as to make the left short wall 15 an extension or an appendage of the left wall 7 of the container. In order for the left Split Ring-spring snap fastener components to be properly assembled, the projecting portion of the first stud 12 must face away from the exterior of the left short wall 15. It is advantageous to place the flat surface of the left strap 14 against the exterior surface of the left short wall 15; doing so provides greater support for the left strap 14 during the act of flexing.

FIGS. 1, 2, and 8 show the tube of the first eyelet 13 joined with the flanged opening of the first stud 12 while occupying a suitable diameter opening within the surface area of the left short wall 15 and left strap 14; providing a tightly compressed means of connection among those said assembled parts and components. To maintain the structural integrity of each part, an adequate thickness of material through each must be considered and provided. Also, a sufficient girth of surface material area around each opening with that of the material's boundary edge must remain. Let it be understood, the preferred sequencing of a tightly compressed collection of an eyelet of the second Split Ring-spring snap fastener thus being a second eyelet 25 component, the right short wall 22, a right strap 23, and an open stud of the second Split Ring-spring snap fastener thus being a second stud 24 component are in reverse order to that assembly of components shown on the left and stated of the first. To iterate, proper orientation of the projecting portion of the second stud 24 is faced away from the exterior surface of the right short wall 22. Likewise, the tube of the second eyelet 25 joined with the flanged opening of the second stud 24 while occupying a suitable diameter opening within the surface area of the right short wall. 22 and right strap 23; providing a tightly compressed means of connection among those said assembled parts and components. To maintain the structural integrity of each part, an adequate thickness of material through each must be considered and provided. Also, a sufficient girth of surface material area around each opening with that of the material's boundary edge must remain.

FIG. 7 is an exploded view showing the preferred sequence and orientation of a cap of the first Split Ring-spring snap fastener thus being a first cap 16 component, an end portion of the left strap 14 (shown truncated by a jagged edge profile), and a socket of the first Split Ring-spring snap fastener thus being a first socket 17 component which incorporates a split ring-spring 29; thus, comprising an assembly of a part and components for which to further assist in the holding of the filament 2. As shown in FIGS. 2, 3, and 8, proper assembly of the first cap 16, left strap 14, and first socket 17 while the device is in an interlocked position dictates the disk surface of the first cap 16 be faced away from the exterior of the device, thus allowing a split ring-spring 29 incorporated in the first socket 17 to properly engage the projecting portion of the first stud 12. For this to occur, the flatly torus flange of the first socket 17 is placed against the surface of the left strap 14 on which the flatly torus flange of the first stud 12 is placed against. FIGS. 2 and 8 both show the shaft of the first cap 16 occupying a suitable diameter opening within the surface area of the left strap 14 and joined with the flanged opening of the first socket 17, thereby providing a tightly compressed connection among those said assembled components. The placement of the first socket 17 on the left strap 14 must be suitably distant from the first stud 12 in order to allow the first socket 17 and its incorporated split ring-spring 29 to interlock with the first stud 12 during the flexing of the left strap 14. Let it also be understood, the preferred sequencing of a socket of the second Split Ring-spring snap fastener thus being a second socket 26 component, the right strap 23, and a cap of the second Split Ring-spring thus being a second cap 27 component are in reverse order to the assembly of components shown on the left and stated of the first. In comparison to FIGS. 2 and 8, the shaft of the second cap 27 occupying a suitable diameter opening within the surface area of the right strap 23 and joined with the flanged opening of the second socket 26, also provide a tightly compressed connection among those said assembled components. Likewise, the placement of the second socket 26 on the right strap 23 must be suitably distant from the second stud 24 in order to allow the second socket 26 and its incorporated split ring-spring 29 to interlock with the second stud 24 during the flexing of the right strap 23. To iterated, for proper installation, the orientation of the disk surface of the second cap 27 must face away from the exterior of the device while interlocked. The advantage of attaching the snap fastener components to the device eliminates them from becoming separated and potentially lost from the device.

While there are many flexible materials from which a Strap may be produced such as leather, cloth, nylon, or a variety of other plastic polymers, it is important that the material resist deformation from strain after many flexures such as the effects of tearing, twisting, stretching, sagging, and translation. In order to guarantee a consistent suitable alignment during the interlocking of the snap fastener components, the strap material is preferred to be produced from polypropylene terephthalate (PET).

Since the invention provides for two separate, symmetrical, direct, and appropriate paths to course filament 2, FIG.

3 shows the filament 2 egressing the left framed opening 35 with the front wall 4 in the upright position and the access opening covered. With the filament 2 having been grasped by the user, its 'working end' is placed into and through the joined opening of the first stud 12 with that of the first eyelet 13 until it egresses into an area of indentation 37. The term 'working end' is rope terminology used herein to reference the portion of the dental filament being pointed or targeted through the parts and components of the device while being coursed. In general terms, it is the severed loose end portion of filament 2 unreeled from the spool 1. The indentation 37 is interposed between the left short wall 15 and the right short wall 22 but also defined at its base by the top wall 18 of the container. After egressing, the working end is grasped, pulled, and placed into and through the tube of the second eyelet 25 joined with the opening of the second stud 24 until it egresses to the exterior of the device where the working end is able to be easily grasped and pulled for a length until it takes on the posture of being suspended alongside the exterior of right wall 8. In order to hold the filament 2 occupying the openings through the second eyelet 25 and second stud 24, the user touches and aligns a split ring-spring 29 incorporated in the second socket 26 to that of the projecting portion of the second stud 24. Applying compression by the act of squeezing the components of the right Split Ring-spring snap fastener between the user's fingers, the split ring-spring 29 is forced over and around the projecting portion of the second stud 24, thus interlocking the second Split Ring-spring snap fastener and holding the working end portion of the filament 2. The advantage of holding the working end allows for the 'standing end', assumed now spanning within the indentation 37 and connected to the spool 1, to be more easily manipulated into a personalized semi-looped shape or flaccid 'bight' 21 when the filament 2 is pulled upward. The terms 'standing end' and 'bight' are also rope terminology used herein. The term 'standing end', in general, refers to the portion of the dental filament 2 between the general working end portion and the spool 1; thus, connecting the working end with the spool 1. The term 'bight', in general, refers to the portion of filament intentionally manipulated to double back on itself, somewhat liken to an uppercase Omega symbol of the Greek alphabet forming a semi-looped flaccid shape to be used in the act of flossing or interdental cleaning. The device inherently enables an easy grasping of the spanning standing end portion of the filament 2 by providing for a suitable adjacency between the invert opening level of the first eyelet 13 and the second eyelet 25 with that of the top wall 18, thereby allowing a user's finger to be placed underneath the spanning standing end which is fully shown in FIG. 2 and partly in FIGS. 1, 8, and 9.

After the user has manipulated the standing end portion of the filament 2 about the indentation 37 into a satisfactory personalized flaccid bight 21, it is then maintained and held by the interlocking of the first socket 17 and its incorporated split ring-spring 29 with that of the first stud 12 in a manner similar to that stated regarding the second snap fastener components. As shown in FIGS. 1, 3, and 9, at the user's discretion, a lid 31 having a capacity to rotate about its base due to a top hinge 30 means interposed between the back portion of the lid 31 and the top portion of the back wall 20, thereby granting the user the ability to rotate the lid 31 adjacent the back wall 20 or above the top wall 18. Let it be known, with the lid 31 in either location, the user's fingers are free to easily manipulate the bight 21 on their fingertips for the act of interdental cleaning while their palms remain unencumbered.

A method to prevent the bight 21 from becoming entangled after its use and possibly preparing the device for storage is to transform the bight 21 into a spanning flaccid filament 2 within the indentation 37, similar in character to the unrestrained standing end of filament 2 shown in FIG. 1. For this to occur, the user need only place the lid 31 in an open rotated position adjacent the back wall 20; disengage the second socket 26 and the first socket 17; pull on the suspended working end of the filament 2 until the standing end, including a length of unused filament 2 unreeled from the spool 1 pass beyond the second stud 24; and, rotate the lid 31 until an area of a mouth 34 located on the front inside surface of the lid 31 engages an extension of material or a catch 33 located on the top frontal portion of the front wall 4; thereby, securing the lid 31 and providing a hygienic protective covering over the filament 2. It would be to the user's advantage to interlock each said snap fastener so to restrain the flaccid spanning filament 2 within the indentation 37 while stored.

Since the suspended working end portion of the filament 2 often becomes too long, the device provides a left sever 19 and a right sever 28 with which to remove a portion of filament 2 each connected on the exterior bottom portion of the left wall 7 and the right wall 8 respectively as shown in FIGS. 1 through 5. Each sever is a typical industry standard sever, preferably stamped from metal having a sloped, blunted, U-shaped projection attached at the width of its base with its elongated and sharpened perimeter edge inclining to a raised position surrounded by a flat base from which its form was stamped. As the filament 2 enters the sloped projection and wherein caught, with a pulling force exerted on it, the filament 2 is severed. It is preferred that each sever have its inclining raised projection faced toward the back of the device; therefore, requiring each to be a mirrored production of the other.

Shown in FIGS. 1, 3, 4, 5, and 9, a suitable tab of strap is preferred to extend beyond the frontal edge of each said cap for to aide in applying torque force upon the snap fastener components for their disengagement. Also, the ability for a Split Ring-spring snap fastener to hold a length of filament 2 unharmed is achieved by them being preferably produced from burr-less polished metal components, thus ensuring their long-term durability and resilience as well as a user's confidence, familiarity, and trust.

While the present invention has been disclosed herein, it will be clear to those skilled in the art that modifications or variations of such details can be made without deviating from the gist of this invention, and such modifications or variations are considered to be within the scope of the claims.

I claim:

1. In combination, a dental filament dispenser and holder device utilizing components of a Split Ring-spring snap fastener to hold dental filament comprising: a right wall, a top wall, a left wall, a bottom wall, a front wall, a slot, a framed opening; a bottom hinge means in which said walls, said slot, said framed opening, and said bottom hinge means adjoin an access opening to a compartment of said container wherein a back wall is opposite said access opening; a reeled spool of dental filament incorporated in said compartment; a working end of said filament unreeled from said spool; said bottom hinge means interposed between said bottom wall and said front wall providing rotatable means for said front wall to cover or expose said access opening and said slot wherein said slot is convertible into a framed opening or said framed opening is convertible into said slot as a result of said front wall exposing or covering said access opening respectively; a short wall appendage of said device; an open stud component of said snap fastener connected to said short wall; an opening through said short wall is congruent with an opening of said stud component; and, a flexible strap connected to said device and connected with a socket component of said snap fastener wherein said socket component has a position in which to interlock with said stud component.

2. The device of claim 1, wherein said flexible strap connected with said device comprises, said flexible strap connected with said short wall.

3. The device of claim 1 further comprising:

an eyelet component of the snap fastener joined with the stud to connect the strap and the stud with the short wall;

a cap component of the snap fastener joined with the socket to connect the socket with the strap;

a post extending from an interior surface of the back wall, the post supporting the spool;

an interference-fit recessed squared notch along the perimeter of the left wall, the top wall, and the right wall, the recessed squared notch configured to mate with a respective squared-off perimeter counterpart of the front wall; and a severing means connected to the device for dividing the filament.

4. The device of claim 3, wherein said filament egressing said framed opening and while occupying said stud, said strap, said short wall, and said eyelet is held by interlocked components of said socket with said stud.

5. In combination, a dental filament dispenser and holder device utilizing components of a first Split Ring-spring snap fastener and components of a second Split Ring-spring snap fastener to hold dental filament in a flaccid bight posture comprising: a right wall, a top wall, a left wall, a front wall, a bottom wall, a left slot, a left framed opening, a right slot, a right framed opening, and a bottom hinge means in which said walls, said bottom hinge means, said slots, and said framed openings adjoin an access opening to a compartment of said container; a back wall of said dispenser and holder device positioned opposing said access opening; a reeled spool of dental filament incorporated in said compartment; a working end of said filament unreeled from said spool; said bottom hinge means interposed between said bottom wall and said front wall providing rotatable means by which to convert said left slot and said right slot into said left framed opening and said right framed opening respectively, and to convert said left framed opening and said right framed opening into said left slot and said right slot respectively as a result of said front wall exposing or covering said access opening respectively; a left short wall appendage and a right short wall appendage of a container between each form an indentation about which said filament may be manipulated; a stud of said first snap fastener connected to said left short wall appendage and a stud of said second snap fastener thus being a second stud component connected to said right short wall appendage wherein an opening through said left short wall is congruently aligned with an opening of said first stud and an opening through said right short wall is congruently aligned with an opening of said second stud; a flexible left strap and a flexible right strap connected with said device; and, a socket of said first snap fastener is connected with said left strap and a socket of said second snap fastener is connected with said right strap wherein said first socket interlocks with said first stud, and said second socket interlocks with said second stud.

6. The device of claim 5, wherein said first strap and said second strap are produced from polypropylene terephthalate.

7. The device of claim 5, wherein said left short wall appendage and said right short wall appendage of said dispenser and holder device comprises said left short wall being an appendage of said left short wall and said right short wall being an appendage of said right short wall.

8. The device of claim 5, wherein said flexible left strap and said flexible right strap are connected with said left short wall and said flexible right strap connected with said right short wall respectively.

9. The device of claim 5 further comprising: an eyelet of said first snap fastener joined with said first stud connecting said left strap, said first stud, and said first eyelet with said left short wall; an eyelet of said second snap fastener joined with said second stud connecting said right strap, said second stud, and said second eyelet with said right short wall; a cap of said first snap fastener joined with said first socket connecting said first socket with said left strap; a cap of said second snap fastener joined with said second socket connecting said second socket with said right strap; a post of an interior surface of said back wall which to support said spool; an interference fit recessed squared notch along the perimeter of said left wall, said top wall, and said right wall to that of their respective left, top, and right squared-off perimeter mating counterpart of said front wall; a top hinge means interposed between said back wall and a lid wherein said top hinge means provides rotatable means for said lid; a mouth on said device wherein engages a catch on said device for which to secure said lid; and, sever means connected to said device.

10. The device of claim 9, wherein said filament egresses said left framed opening while occupying an opening of said first stud, said left strap, said left short wall, said first eyelet, said second eyelet, said right short wall, said right strap, and said second stud while egressing said second stud wherein, said second socket interlocks with said second stud and said first socket interlocks with said first stud holding said filament, or said filament egresses said right framed opening while occupying an opening of said second stud, said right strap, said right short wall, said second eyelet, said first eyelet, said left short wall, said left strap, and said first stud while egressing said first stud wherein, said first socket interlocks with said first stud and said second socket interlocks with said second stud holding said filament.

11. A method of holding a dental filament, comprising the steps of:

utilizing interlocking Split Ring-spring snap fastener components connected with a dental filament holder device;

incorporating a spool of the filament in a compartment of the device;

pulling a working end of the filament unreeled from the spool;

placing the working end through a first stud component of a first split ring-spring snap fastener, the first stud component being connected with a left wall appendage of the device;

placing the working end through an opening of a left strap;

placing the working end through an opening of the left wall appendage;

placing the working end through a first eyelet component of the first snap fastener, the first eyelet component interlocking with the first stud component;

grasping and pulling the working end;

placing the working end through a second eyelet component of a second split ring-spring snap fastener;

placing the working end through an opening of a right wall appendage;

placing the working end through an opening of a right strap;

placing the working end through a second stud component of the second snap fastener, the second eyelet component interlocking with the second stud component;

pulling the working end to a suspending position alongside the device;

compressing and interlocking a second socket component of the second snap fastener with the second stud component, the second socket component being connected with the right strap;

manipulating a standing end of the filament into a bight; and compressing and interlocking a first socket component of the first snap fastener with the first stud component, the first socket component being connected with the left strap.

12. The method of holding dental filament set forth in claim 11, wherein the second socket component is connected with the right strap by a second cap component of the second snap fastener, and wherein the first socket component is connected with the left strap by a first cap component of the first snap fastener.

13. The method of holding dental filament set forth in claim 11, wherein said left strap and said right strap are produced from polypropylene terephthalate.

14. The method of holding dental filament set forth in claim 11, further comprising the steps of:

placing the spool rotatably on a post within the compartment;

placing the working end into a left slot of the device adjoining an exposed access opening, or alternatively into a right slot of the device adjoining the exposed access opening;

converting the left slot and the right slot into a left framed opening and a right framed opening, respectively, by rotating a front wall of the device to a closed position covering the access opening;

flexing the right strap toward the right stud component such that the second socket component and the second stud component touch and align; and flexing the left strap toward the left stud component such that the first socket component and the first stud component touch and align.

15. The method of holding dental filament set forth in claim 11, wherein said manipulation of said standing end into said bight occurs about an indentation among said left short wall appendage, said right short wall appendage, and a top wall of said device.

16. The method of holding dental filament set forth in claim 11, wherein said bight is formed into a personalized flaccid bight.

* * * * *